(12) United States Patent
Lubin et al.

(10) Patent No.: US 7,298,865 B2
(45) Date of Patent: Nov. 20, 2007

(54) SECURE ROBUST HIGH-FIDELITY WATERMARKING (75) Inventors: Jeffrey Lubin, Princeton, NJ (US); Jeffrey Adam Bloom, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 761 days.

(21) Appl. No.: 10/124,995

(22) Filed: Apr. 18, 2002

(65) Prior Publication Data
US 2003/0021439 A1 Jan. 30, 2003

Related U.S. Application Data (60) Provisional application No. 60/308,718, filed on Jul. 30, 2001.

(51) Int. Cl.
G06K 9/00 (2006.01)
G06K 15/00 (2006.01)

(52) U.S. Cl. ...................... 382/100; 358/3.28

(58) Field of Classification Search ............... 382/100; 358/3.28; 713/176; 380/28, 30, 54
See application file for complete search history.

(56) References Cited

U.S. PATENT DOCUMENTS

| | | | |
|---|---|---|---|
| 5,664,018 A | 9/1997 | Leighton | 380/54 |
| 5,905,819 A * | 5/1999 | Daly | 382/284 |
| 5,930,369 A | 7/1999 | Cox et al. | 380/54 |
| 6,044,156 A * | 3/2000 | Honsinger et al. | 380/54 |
| 6,130,741 A * | 10/2000 | Wen et al. | 355/40 |
| 6,137,904 A | 10/2000 | Lubin et al. | 382/162 |
| 6,594,373 B1 * | 7/2003 | Gustafson | 382/100 |
| 6,611,608 B1 * | 8/2003 | Wu et al. | 382/100 |
| 6,678,389 B1 * | 1/2004 | Sun et al. | 382/100 |
| 6,718,045 B2 * | 4/2004 | Donescu et al. | 382/100 |
| 6,792,129 B1 * | 9/2004 | Zeng et al. | 382/100 |
| 6,792,130 B1 * | 9/2004 | Jones et al. | 382/100 |

OTHER PUBLICATIONS

D.H. Kelly, "Motion and Vision, II. Stabilized Spatio-Temporal Threshold Surface," J. Opt. Soc. of Am., 69(10), pp. 1340-1349, 1979.

Cox, et al., "A Secure, Imperceptable yet Perceptually Salient, Spread Spectrum Watermark for Multimedia," SouthCon/96, Conference Record Orlando, FL Jun. 25-27, 1996, 192-197.

Lu, et al., "Highly Robust Image Watermarking Using Complementary Modulations," Information Security International Workshop, 1749, 1999, 136-153.

Podilchuk, et al., "Image-Adaptive Watermarking Using Visual Models," Communications, 16 (4), May 1998, 525-539.

(Continued)

Primary Examiner—Vikkram Bali
Assistant Examiner—Colin LaRose
(74) Attorney, Agent, or Firm—Lowenstein Sandler PC (57) ABSTRACT For each small image region (in space and time), a measure of perceptual transparency of each of a set of possible watermark carrier modulations is used to choose a subset of such modulations, from which a secure random number generator selects, for each image region, a single carrier, modulations of which carry the watermark data.

22 Claims, 5 Drawing Sheets

OTHER PUBLICATIONS

Swanson, et al., "Multiresolution Scene-Based Video Watermarking Using Perceptual Models," IEEE J Selected Areas in Communications, 16(4), May 1998, 540-550.

Wang, et al., "Identify Regions of Interest (ROI) for video watermark embedment with Principle Component Analysis," Proceedings ACM Multimedia 2000 Workshops, Marina del Ray, CA Nov. 4, 2000, 459-461.

Wei, et al., "Perceptual Digital Watermark of Images Using Wavelet Transform," IEEE Transactions on Consumer Electronics, 44(4) Nov. 1998, 1267-1272.

Copy of European Search Report dated Jul. 6, 2004 from corresponding European Patent Application 02255014.9.

D.H. Kelly, "Visual Processing of Moving Stimuli", J. Opt. Soc. Am. A, vol. 2, No. 2/Feb. 1985, pp. 216-225.

* cited by examiner

PRIOR ART

*FIG. 5*

SECURE ROBUST HIGH-FIDELITY WATERMARKING

CROSS-REFERENCE TO RELATED APPLICATIONS

This application claims the benefit of the filing date of U.S. provisional application No. 60/308,718, filed on Jul. 30, 2001.

BACKGROUND OF THE INVENTION

1. Field of the Invention

The present invention relates to video processing, and, in particular, to the insertion and recovery of watermark data into and from video works.

2. Description of the Related Art

A major barrier to the development and deployment of distribution channels for motion imagery content (e.g., video download, digital cinema) is the concern of content providers that their copyrighted material may be copied and then subsequently distributed without appropriate authorization. Encryption is an important component of a Digital Rights Management (DRM) approach to controlling access to the content. However, once access has been granted, the decrypted content is left unprotected. Thus encryption alone cannot prevent all instances of theft. Persistent access control methods that rely on proprietary file formats and the use of compliant devices have been proposed, but ultimately all video must be converted to pixel brightness and color for display. At this point, the video is vulnerable.

Given these potential leaks, a content owner needs forensic tools that enable the tracking of unauthorized copies back to the party who licensed the use of the content, and who was responsible for preventing its further distribution. The ability of the content owners to identify the exact distribution point at which material was stolen can be used as a tool to identify the responsible parties and can act as a deterrent to such theft. A superimposed pattern on the digital imagery content uniquely identifying, in the content itself, the licensee of that copy of the content can serve this purpose. Such a watermark will give content owners a powerful forensic tool against piracy.

Consistent with those stated by SMPTE DC28.4 for their Download Watermark and Exhibition Watermark, a forensic watermark used for purchaser identification should have the following properties:

1. It should satisfy the high-fidelity requirements of the content owners.
2. Exhibition watermarks should be robust to the combination of exhibition capture and compression.
3. Exhibition watermarks should be secure against unauthorized removal and unauthorized embedding.

Of the three properties listed above, no existing watermarking algorithm has yet demonstrated simultaneously acceptable performance in all three—fidelity, robustness, and security. In addition to these three properties, a forensic watermark can have the following features:

a. Detection of the watermark can rely on the use of a reference. This reference may be the corresponding unmarked video or a data vector derived from the unmarked video.
b. Detection is allowed to be an expensive process, since there will be few detectors, few applications of the detectors, and the nature of detection is such that it need not be done in real time.

SUMMARY OF THE INVENTION

The present invention is directed to a watermarking algorithm that can be used to achieve satisfactory levels of fidelity, robustness, and security for many video applications.

According to one embodiment, the present invention is a method for encoding watermark data into a data stream and the resulting watermarked data stream. The method comprises the steps of (a) identifying a set of one or more watermark carriers for potential use in encoding the watermark data into the data stream; (b) analyzing content of the data stream to identify a plurality of potential locations in the data stream for encoding the watermark data into the data stream, wherein each potential location corresponds to an acceptable encoding of a portion of the watermark data using a particular one of the watermark carriers in the set; (c) selecting a subset of the potential locations; and (d) for each selected location, modulating the corresponding watermark carrier by a portion of the watermark data and inserting the resulting modulated watermark carrier into the data stream at the selected location.

According to another embodiment, the present invention is a method for encoding watermark data into a data stream and the resulting watermarked data stream. The method comprises the steps of (a) modulating a watermark carrier by a portion of the watermark data, wherein the watermark carrier is based on a spatio-temporal frequency pattern having a frequency below a peak of a spatio-temporal contrast sensitivity function; and (b) inserting the resulting modulated watermark carrier into the data stream at the selected location.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

As suggested earlier, a desirable watermarking algorithm is one that provides sufficiently high levels of robustness, fidelity, and security, where the phrase "sufficiently high" is determined by the specific application.

Figure 1:
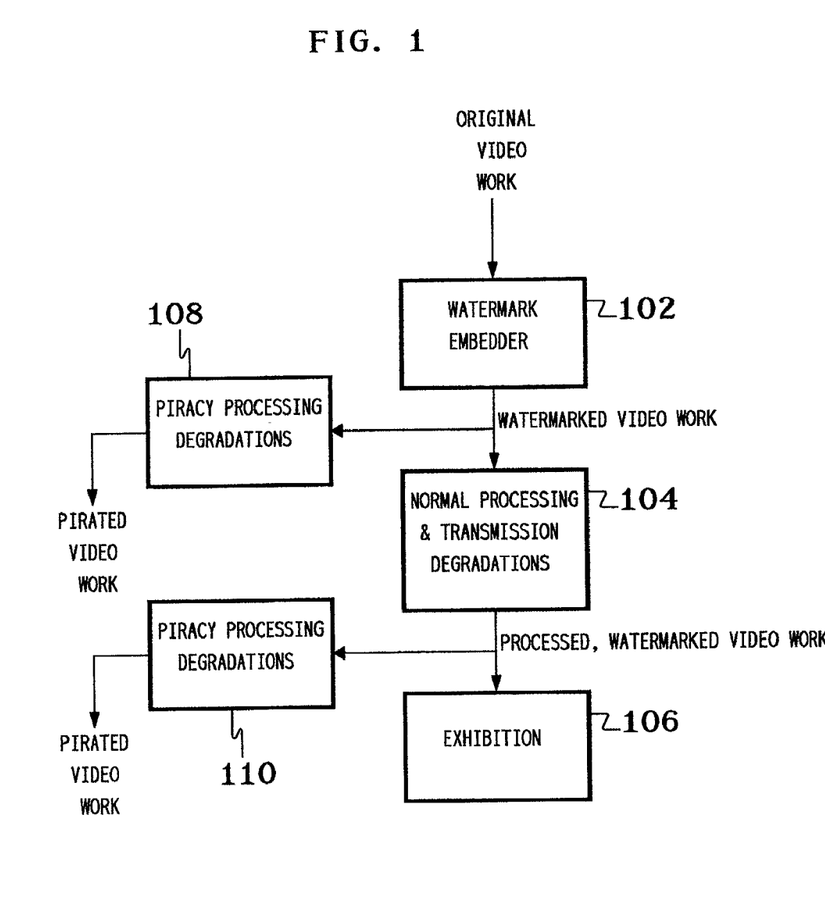
FIG. 1 shows a block diagram representing video piracy of a watermarked video work.

FIG. 1 shows a block diagram representing video piracy of a watermarked video work. As shown in FIG. 1, an original video work is processed by a watermark embedder 102 to produce a watermarked video work. The watermarked video work is a modified version of the original video work such that the modification introduced by watermark embedder 102 represents certain watermark data.

The fidelity of a watermarking algorithm refers to the degradation in visual quality introduced by watermark embedding process. The fidelity of the algorithm is defined as the fidelity of the watermarked video work with respect to the original video work. Many watermarking applications require that the degradation due to watermark embedder 102 is completely or at least substantially invisible to the human eye.

There are a number of normal processing and transmission degradations 104 to which the watermarked video work is likely to be exposed prior to exhibition 106. These may include compression, color space conversion, and digital-to-analog conversion. Upon being misappropriated (e.g., via unauthorized copying or unauthorized capture), the watermarked video work may be further subjected to piracy processing degradations as described below. Piracy processing degradations associated with unauthorized copying 108 can include, for example, very low bit-rate compression.

A typical example of unauthorized capture is the recording of a movie by a video camcorder during an exhibition. Piracy processing degradation 110 associated with unauthorized capture includes the degradations introduced by the camcorder, which may include one or more of the following: geometric transformations (e.g. rotation, skew, perspective distortion, and/or temporal or spatial stretching), filtering, cropping, introduction of occlusions, and luminance non-linearity.

After unauthorized copying or capture, a pirated video work is likely to be compressed at a relatively low bitrate for storage on a video CD or for distribution over the Internet. Such compression typically results in resolution reduction and compression artifacts (e.g., blocking).

The robustness of the watermarking algorithm disclosed herein refers to the likelihood that the watermark data can be recovered from a pirated video work, where it is assumed that the pirated video work is a version of the watermarked video work that has been further subjected to normal processing and transmission degradations, piracy processing degradations, or both.

For many applications, a watermarking algorithm is considered sufficiently robust if the watermark data survives typical levels of these kinds of degradations during video processing normally associated with video content piracy, where survival means that all or at least a sufficient amount of the watermark data can be recovered from the pirated version of the video work.

The security of a watermarking algorithm refers to the difficulty of a party to perform a watermarking operation without explicit authorization. This specification addresses security against unauthorized watermark embedding and security against unauthorized watermark removal.

A watermark algorithm is secure against unauthorized watermark embedding if it is computationally infeasible for a party to embed valid watermark data into a video work without knowledge of a secret. This secret often takes the form of a secret watermark key, analogous to the secret cipher key used in cryptography. Embedding valid watermark data means modifying the video work such that an uncompromised watermark detector would extract said data and deem it valid.

A watermark algorithm is secure against unauthorized watermark removal if it is computationally infeasible for a party to modify the watermarked video work such that the watermark data cannot be reliably recovered without introducing sufficient visual distortion so as to render the resulting video work worthless. Unauthorized watermark removal includes erasure of the watermark data, modifications to the watermarked video works that inhibit proper functioning of the detector, and embedding of spurious watermark data such that the detector cannot reliably distinguish between valid and invalid data. This last approach is referred to as "jamming."

Figure 2:
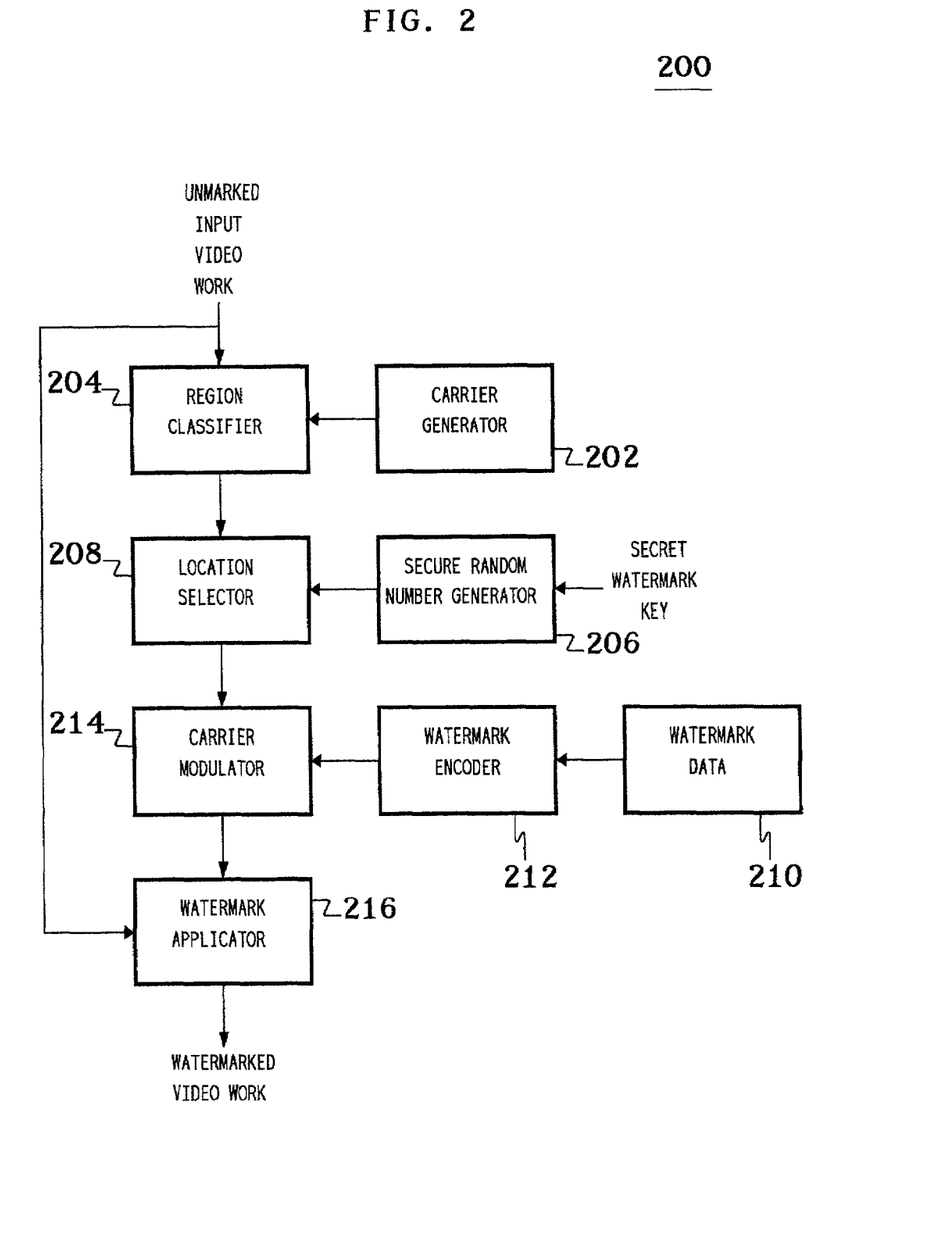
FIG. 2 shows a block diagram of a watermark insertion system, according to one embodiment of the present invention.

FIG. 2 shows a block diagram of a watermark insertion system 200, according to one embodiment of the present invention. Watermark insertion system 200 is designed to encode watermark data into the content (i.e., the actual image data) of an input video work in a manner that achieves satisfactory levels of robustness, fidelity, and security.

The watermarking algorithm of insertion system 200 involves a two-part procedure: an analysis process, followed by a selection/insertion process. The analysis process involves the identification of different available spatio-temporal locations within a video work for the insertion of suitable watermark carriers that are to be used to encode the watermark data. The selection/insertion process involves (1) the selection of specific locations from those different available locations and (2) the insertion of the watermark data at those selected locations using the corresponding watermark carriers.

In a typical implementation, the analysis process is performed once, off-line, for each original (i.e., unmarked) video work, while the selection/insertion process is performed (e.g., in real time) each time a different set of watermark data is to be embedded in a different copy of the original video work. For example, in the case of exhibition of a particular movie at different movie theatres, the input video work corresponds to the original (i.e., unmarked) movie. Each time the movie is exhibited at a movie theatre, a unique set of watermark data is encoded into the video content, where that watermark data might be intended to uniquely identify the particular exhibition. This may include a movie theater identification, the date and time of the exhibition, serial numbers of the associated decryption, decompression, and exhibition devices, and global positioning system (GPS) coordinates of the playback equipment.

Referring to FIG. 2, the analysis process is implemented by carrier generator 202 and region classifier 204 of insertion system 200. Carrier generator 202 generates a set of one or more suitable watermark carriers for use in encoding watermark data into the input video work. As used in this specification, the term "carrier" refers to a robust, imperceptible, localized pattern that can support modulation to encode watermark data. The one or more different watermark carriers generated by carrier generator 202 may be based on different types of modulation (e.g., amplitude, frequency, or phase) and different magnitudes.

A video work may be thought of as a three-dimensional (3D) spatio-temporal "volume" of video data, where two of the three dimensions correspond to the height and width (in terms of pixels) within each video picture (e.g., frame or field) and the third dimension corresponds to time (in terms of numbers of consecutive pictures). For example, a digital video bitstream corresponding to a two-hour movie having 30 frames per second (fps) with (600×800) pixels per frame corresponds to a video volume that is 600 pixels high by 800 pixels wide by 216,000 frames long.

One possible type of watermark carrier used to encode watermark data into the video volume of an input video work corresponds to a relatively small 3D volume having a height, a width, and a duration, where each pixel in the watermark volume has a specified value (which could be positive, negative, or zero). For example, the 3D volume for a particular watermark carrier could be 30 pixels high, 40 pixels wide, and 150 frames long (e.g., corresponding to a duration of 5 seconds in a 30-fps video stream), where each pixel in the 3D watermark carrier has a specific integer value. To embed a bit of coded watermark data in an input video work, the watermark carrier is modulated based on the value of the data bit, and the resulting modulated watermark carrier is then applied (pixel by pixel) to a corresponding set of pixels in the video volume of the input video work, where that corresponding set in the video volume may be identified, for example, by the location of its center pixel (e.g., X,Y coordinates in frame Z). The 3D volume occupied by a watermark carrier need not be a contiguous set of pixels. It may be a number of disjoint sets of pixels.

According to one possible modulation scheme, if the bit of encoded watermark data has a logical "1" value, then the pixels of the 3D watermark carrier are added (pixel by pixel) to the corresponding pixels in the 3D video stream. If the bit of watermark data has a logical "0" value, then the pixels of the 3D watermark carrier are subtracted from the corresponding pixels in the 3D video stream. In another possible modulation scheme, a logical "1" bit is encoded in the same way as before, while a logical "0" value is "encoded" by leaving the corresponding pixels in the original 3D video stream unchanged. Of course, other permutations of these basic modulation schemes are also possible.

One possible 3D watermark carrier is based on a one-dimensional Gaussian function whose peak value is located at the center of the 3D pattern, in which the values of the pixels in the 3D volume corresponding to the watermark carrier start at (or near) zero in the first "frame" of the watermark volume, increase in a Gaussian manner towards the frame located at the center of the watermark volume, and then decrease in a Gaussian manner towards the last frame in the watermark volume, where, within each frame of the 3D watermark carrier, all of the pixel values are the same and where the peak value is a positive value corresponding to the amplitude of the Gaussian function. The addition of such a Gaussian watermark carrier into a video work would correspond to a gradual lightening of a rectangular area in the video display followed by a gradual darkening. If the pattern is sufficiently long (i.e., lasts for a sufficient duration) and if the amplitude of the Gaussian function is not too large, then the gradual lightening and then darkening of the display should be invisible to the viewer except perhaps at the boundaries of the rectangle. If the watermark carrier is designed, not as a spatial rectangle, but rather with a boundary that corresponds to edges in the original video work, then this modulated watermark carrier can be invisible. Note that, for a modulation scheme in which a logical "0" is encoded by subtracting the watermark carrier from the video work, the subtraction of the Gaussian watermark carrier will correspond to a gradual darkening of the area followed by a gradual lightening.

Another possible (and more preferred) 3D watermark carrier is a 3D spatio-temporal Gaussian having a peak value at some specified X, Y, and t location, whose amplitude falls off, not only in time in each direction, but outward in space as well.

A 3D watermark carrier can be any 3D set of pixel values, whether they form a uniform pattern, such as those based on a Gaussian function, or any other possible pattern. Of course, not every possible set of pixel values will form a suitable watermark carrier. In general, a suitable watermark carrier is one that satisfies the robustness and fidelity requirements for the particular application, as those terms were previously defined.

In addition, in preferred implementations of the present invention, a suitable watermark carrier is one that has the joint property that any one carrier could be inserted invisibly, but that insertion of more than one overlapping watermark carrier creates visible artifacts, the strength of which increases with the number of overlapping carriers. For example, physiological and psychophysical literature on "sub-threshold summation" suggests that groupings of spatially proximate carriers, especially those arranged into simple visual patterns (e.g., bars and edges), will produce visual effects that tend to increase with the sum of signal energy across the group.

Carrier generator 202 generates one or more suitable watermark carriers for a particular application. The characteristics of a suitable watermark carrier will typically vary from application to application. For example, watermark carriers that are suitable for a movie theatre may differ from those that are suitable for tracking down Internet-based pirates. Suitable watermark carriers may also differ for different types of video content. For example, watermark carriers that are suitable for full-color motion imagery may be different from those that are suitable for a gray-scale video slide show consisting of a sequence of black-and-white photographs.

Depending on the implementation, carrier generator 202 may generate suitable watermarks carriers based on purely objective criteria or it may rely on subjective data, such as actual feedback from human subjects. Carrier generator 202 may be implemented separately (and typically off-line). Carrier generator 202 may subject a relatively large set of potential carriers to analyses (e.g., simulation of a complete imaging system) that reveal which carriers among this larger set, and with what levels and kinds of modulation (e.g., amplitude, frequency, or phase), would be robust within the watermark's intended application domain. For example, an application that requires robustness to low-quality camcorder capture may be restricted to lower frequency watermark carriers than an application that requires robustness to moderate bitrate compression. In one embodiment, the carrier generator module performs an analysis of likely degradations in terms of their effects on spatio-temporal components of the content (e.g., spatio-temporal frequencies) and determines those components that are likely to be unaffected by the degradations (e.g., very low spatio-temporal frequencies). Analyses other than spatio-temporal frequency analysis are also possible, including spatial, temporal, spatio-temporal, and wavelet decompositions. In general, an analysis involves decomposing the input signal (e.g., an original video work) into a plurality of components to determine which signal components are likely to be unaffected by the expected degradation(s), including possibly piracy processing degradations 108 or 110 of FIG. 1 in addition to normal processing and/or transmission degradations 104.

Figure 5:
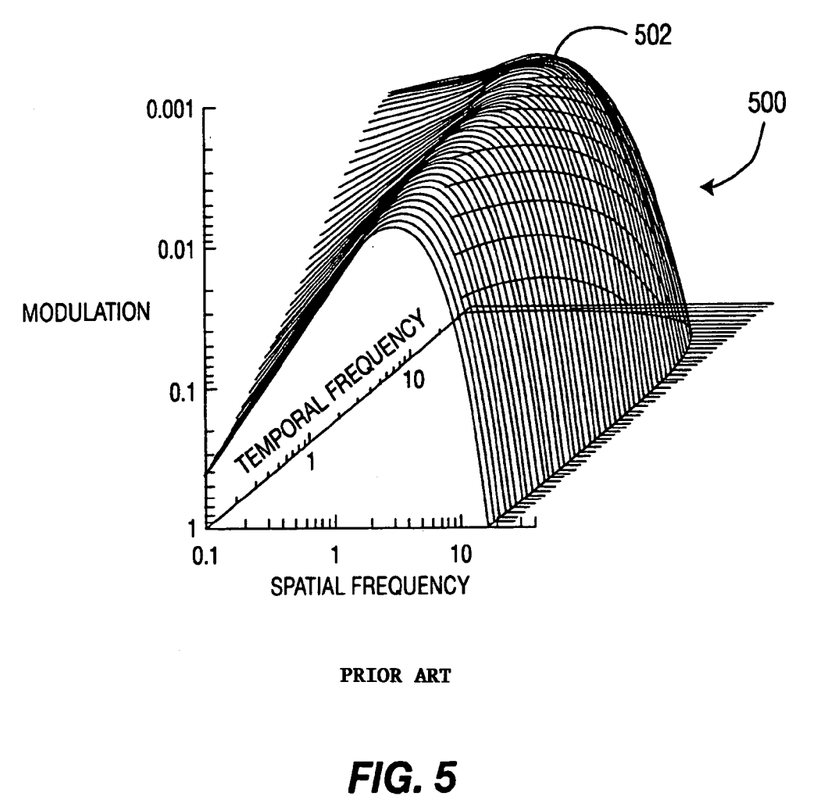
FIG. 5 shows a perspective view of a spatio-temporal threshold surface.

Such analysis has identified very low spatio-temporal frequency watermark patterns, including those based on the 3D Gaussian patterns described previously, as suitable watermark carriers. In certain embodiments, very low spatio-temporal frequency watermark patterns are those having frequencies below the peak of the spatio-temporal contrast sensitivity function described in D. H. Kelly, "Motion and Vision, II. Stabilized Spatio-Temporal Threshold Surface", J. Opt. Soc. of Am., 69(10), pp. 1340–1349, 1979, the teachings of which are incorporated herein by reference. FIG. 5 depicts a perspective view of a spatio-temporal threshold surface 500 of a contrast sensitivity function. i.e., the threshold level at which motion is detected. Each individual curve represents the spatial frequency response at a fixed temporal frequency. The shape of the threshold surface conveys important information about the image processing properties of the retina. At low temporal frequencies (near the front of the surface), the spatial response is a bandpass function of spatial frequency. The peak 502 of the surface occurs at a spatial frequency of about 3 cy/deg and a temporal frequency of about 10 Hz. Placing watermark patterns having frequencies below the peak 502. i.e., having frequencies in the front left region of the graph of FIG. 5, creates a watermark that is substantially invisible. More particularly, the patterns should have a sensitivity at least an order of magnitude below that at the peak.

Region classifier 204 identifies, for each watermark carrier generated by carrier generator 202, potential locations in the 3D volume corresponding to the input video work where the watermark carrier could be "invisibly" inserted into the video work (e.g., taking into account both logical "1" and logical "0" modulation of that watermark carrier), but where the insertion of additional carriers (e.g., by someone who is attempting to jam the watermark signal) would create visible artifacts. In a preferred embodiment, region classifier 204 performs the JND (Just Noticeable Difference) analysis described in U.S. Pat. No. 6,137,904, the teachings of which are incorporated herein by reference. In general, other suitable perceptual models can be used by region classifier 204 to identify potential locations for the watermark carriers based on the content of the input video work.

In one embodiment of the present invention, region classifier 204 divides the input video stream into a plurality of 3D regions in the 3D video volume, where each region corresponds to a subset of the input video stream. For example, in an implementation that uses 3D watermark carriers of size (30 pixels×40 pixels×150 frames), each region could be a different video "sub-volume" (e.g., 600 pixels×800 pixels×300 frames) corresponding to a different 10-second sequence in the 30-fps input video stream. Region classifier 204 could determine whether each watermark carrier generated by carrier generator 202 satisfies the above-mentioned JND criterion at each location within each region of the input video stream.

Figure 3:
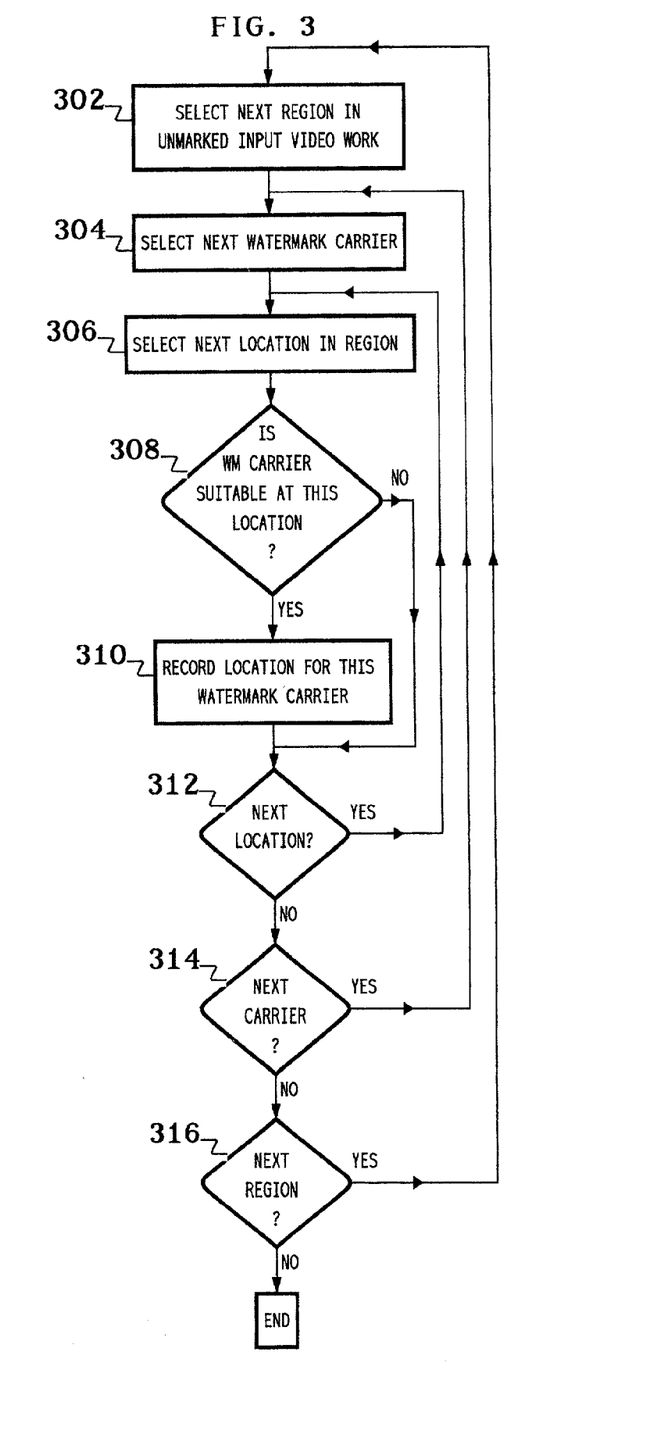
FIG. 3 shows a flow diagram on one possible implementation of the processing implemented by the region classifier of FIG 2.

FIG. 3 shows a flow diagram on one possible implementation of the processing implemented by region classifier 204 of FIG. 2. This implementation involves three nested loops: an outer loop sequentially selecting each different region in the input video work (steps 302 and 316), an intermediate loop sequentially selecting each different watermark carrier generated by carrier generator 202 (steps 304 and 314), and an inner loop sequentially selecting each different location within the currently selected region (steps 306 and 312). Within the inner loop, JND analysis is performed to determine whether the JND criterion would be satisfied if the currently selected watermark carrier were inserted (based on either logical "1" or logical "0" modulation) at the currently selected location in the currently selected region of the input video work (step 308). If so, then information about the current location and the current watermark carrier is recorded for subsequent processing (step 310).

For a given watermark carrier and a given region, there are a finite number of different locations where that watermark carrier can be inserted into that region. In one implementation, region classifier 204 could test each and every one of those locations. Alternatively, region classifier 204 could be implemented to test only a subset of those locations (e.g., locations separated from one another by a specified distance in the 3D video space).

The processing of FIG. 3 identifies, for each region in the input video work, a set of available locations for inserting corresponding watermark carriers. For implementations involving two or more different watermark carriers, region classifier 204 would identify both the available locations and the particular watermark carriers associated with those locations. Note that, for such implementations, region classifier 204 might identify two or more different watermark carriers as being suitable for insertion at a single location. This does not mean that multiple watermark carriers could be inserted invisibly at that location; rather, it means that any one of the two or more different watermark carriers could be inserted invisibly at that location.

In typical video content, if a watermark carrier can be inserted invisibly at a particular location in the video work (based on the relative characteristics of both the watermark carrier and that particular location in the video work), then the probability is high that that same watermark carrier could instead be inserted invisibly into nearby locations in the video work. Similarly, if a watermark carrier cannot be inserted invisibly at a particular location, then the probability is high that that same watermark carrier could not be inserted invisibly into nearby locations. Furthermore, if a particular watermark carrier can (cannot) be inserted invisibly into a particular location in the video work, then the probability is high that similar watermark carriers could (could not) be inserted invisibly into the same location. As a result, the processing of FIG. 3 will typically produce higher-density and lower-density distributions of available locations throughout each region, with clusters of available locations appearing in the results, as opposed to a uniform distribution of available locations.

The processing of FIG. 3 only needs to be performed once (e.g., during off-line, non-real-time processing) for each different input video work. The results are recorded for use during the subsequent selection/insertion process, which is executed each time a different set of watermark data is to be inserted into a different copy of the original input video work.

In one possible implementation, the selection/insertion process (i.e., the second part of the watermarking algorithm performed by insertion system 200) involves the embedding of only a single bit of coded watermark data into each region of the input video work that was analyzed in the processing of FIG. 3. In this case, for each region, only one of the available locations is selected and a single bit of coded watermark data is used to modulate the corresponding watermark carrier for insertion at that selected location. Other possible implementations may support the embedding of more than one bit of coded watermark data into each region of the input video work. In these cases, region classifier 204 may also perform some "post-processing" of the information generated during the processing of FIG. 3.

In order to increase the security of the watermarking algorithm, it may be desirable to select one or more of the available locations in each region for insertion of watermark carriers based on the relative densities in the distribution of the available locations in the region. In certain situations, security can be increased by inserting watermark carriers at high-density locations. The motivation for this is as follows.

In order to jam the watermark data in a watermarked video work, a pirate might try to insert jamming patterns at each of the available locations in the video work. By purposely inserting watermark carriers into high-density locations, it might make it harder for a pirate to effectively jam the watermark data without creating visible artifacts in the jammed video work. In this case, region classifier 204 could perform optional post-processing involving a cluster analysis that characterizes and identifies clusters of available locations in the results generated during the processing of FIG. 3. A different watermark carrier could then be inserted into each cluster. Another part of this post-processing phase could be to impose a minimum distance between clusters of available locations to ensure that different watermark carriers do not overlap with one another in the watermarked video work.

In any case, region classifier 204 completes the analysis phase (i.e., the first part of the watermarking algorithm performed by insertion system 200). The selection/insertion phase involves (a) the selection of one or more different locations and their corresponding watermark carriers from among the available locations in each region of the video work identified during the analysis phase, (b) the encoding of the watermark data to produce the coded watermark data, and (c) the embedding of the coded watermark data into the input video work by modulating each selected watermark carrier by a different bit of the coded watermark data and applying the modulated watermark carriers to the input video work.

As shown in FIG. 2, in order to achieve security, secure random number generator 206 uses a secret (i.e., private) watermark key to generate a random (or at least pseudo-random) sequence of values that is used by location selector 208 to select one or more of the available locations in each region of the input video work. Watermark encoder 212 encodes the watermark data 210 for improved robustness. This encoding may include redundant coding, error correction coding (e.g. trellis coding), or encryption. The use of encryption can increase the security of the watermarking algorithm against unauthorized embedding. Carrier modulator 214 modulates the watermark carrier associated with each of the selected locations by a different bit of coded watermark data. The resulting modulated watermark carriers are then applied to the input video work by watermark applicator 216 to generate the watermarked video work. In a preferred embodiment, watermark applicator 216 adds the modulated carriers to the input video work. However, other techniques such as multiplication and mixing are possible. See, e.g., M. L. Miller, I. J. Cox, and J. A. Bloom, "Informed embedding: exploiting image and detector information during watermark insertion," Proceedings of the IEEE International Conference on Image Processing, vol. 3, pp. 1–4, 2000, and U.S. Pat. No. 6,128,736, the teachings of both of which are incorporated herein by reference. Because only a fraction of the available locations in the input video work are actually used to represent watermark data and because those selected locations are secret (i.e., not known to the video pirate), a relatively high level of security against unauthorized erasure can be achieved.

Every time a different set of watermark data is inserted into a different copy of the input video work, a different secret watermark key may be used to generate a unique sequence of values used to select from among the predetermined set of available locations. Although using a different key for each different set of watermark data is not necessary, doing so will ensure that the set of locations at which the watermark data are inserted into the input video work will differ for each differently watermarked version of the input video work, which can increase the security of the watermarking algorithm against unauthorized embedding and unauthorized removal.

Figure 4:
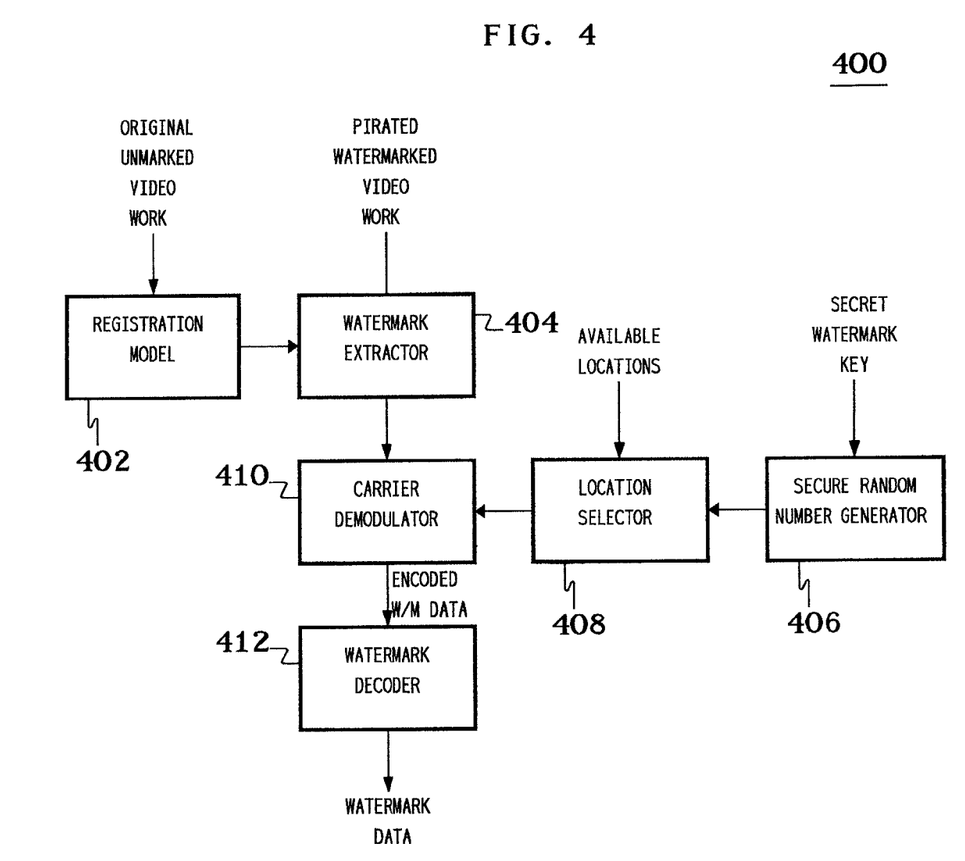
FIG. 4 shows a watermark recovery system, according to one embodiment of the present invention.

FIG. 4 shows a watermark recovery system 400, according to one embodiment of the present invention. Recovery system 400 can be used to decode the watermark data from a pirated version of a watermarked video work. As shown in FIG. 4, recovery system 400 optionally passes a copy of the original (i.e., unmarked) video work (i.e., identical to the input video work in FIG. 2) through a registration model 402. The purpose of this step is to align the distorted video more closely to the reference video in space, time, and gray level, so that a sequence of difference images between the reference and distorted video will produce as clean as possible a trace of the inserted watermarks. The particular processing implemented by registration model 402 will depend on the particular type of activities involved in generating the pirated video work. For example, if the pirated video work is a low bit-rate video stream, then registration model 402 could perform gray-scale registration and resizing only, to bring the spatial dimensions and gray-scale range of the pirated and original content into alignment. If, on the other hand, the pirated video work was generated using a video camera to record the exhibition of a movie at a movie theater, then geometric transformations may also be necessary to bring the pirated content into alignment. The registration process need not be automatic; it may be performed under the direction of a human operator.

In general, the registration process may include any of spatial, temporal, frequency, color, brightness, or contrast registration and is intended to ensure that the pixel-by-pixel subtraction operation is performed on corresponding pixels in the two video works. This is especially important when the pirated video work was generated using a video camera.

Watermark extractor 404 extracts a watermark pattern by subtracting the reference video work from the pirated video work. The extracted watermark generated by watermark extractor 404 corresponds to a noisy map of all the embedded modulated watermark carriers. The coded watermark data can be recovered from this noisy map using a number of different techniques depending on how much information about the processing performed by watermark insertion system 200 of FIG. 2 is available to watermark recovery system 400. In particular, the different sets of information about the processing performed by insertion system 200 include:

The original, unmarked video work;
The one or more watermark carriers generated by carrier generator 202;
The sets of available locations for those one or more watermark carriers identified by region classifier 204;
The secret watermark key applied to random number generator 206;
The random number sequence generated by random number generator 206;
The selected locations selected by location selector 208;
The set of watermark data 210;
The set of coded watermark data output by watermark encoder 212;
The secret cipher key used by watermark encoder 212 to encrypt the watermark data; and
The watermarked video work generated at watermark applicator 216.

Depending on the particular implementation, one or more of these different sets of information are recorded during the processing of insertion system 200 for use by recovery system 400 in recovering the watermark data from the pirated video work.

At one extreme is the situation where recovery system 400 has minimal knowledge from the processing of insertion system 200. For example, in one such implementation, the only information available to recovery system 400 is the original, unmarked video work and the one or more watermark carriers generated by carrier generator 202. In this case, a possible "brute force" technique would be to apply a matched filter for each of the different modulated watermark carriers to the noisy map generated by watermark extractor 404 to find the best matches, where each match would indicate a different bit of recovered coded watermark data. This technique would require a modulation scheme in which both logical "1"s and logical "0"s were explicitly embedded into the input bit stream by applying modulated watermark carriers (as opposed, for example, to the implicit encoding of logical "0"s by leaving the original video content unchanged at specified locations).

The opposite extreme case of maximal information from the watermark insertion process would involve the recording of each location and its corresponding watermark carrier selected during location selection 208 of FIG. 2 as well as the coded watermark data output by watermark encoder 212 used to modulate those selected watermark carriers in carrier modulation 214 during the watermark insertion processing of each input video work. The noisy map generated by watermark extractor 404 could then be analyzed using each recorded set of information corresponding to each time a different set of watermark data was encoded into a copy of the input video work to determine which set of watermark data most closely matches the noisy map.

Other possible watermark recovery algorithms require less information from the watermark insertion processing of FIG. 2. For example, the watermark data could be recovered based on a recorded set of information that included only the selected locations and their corresponding watermark carriers (i.e., without necessarily recording the coded watermark data itself), by generating the two different corresponding modulated watermark carriers (i.e., one for logical "1" and one for logical "0") for each different selected location. Similarly, if the set of watermark carriers generated during carrier generation 202 of FIG. 2 were known to watermark recovery system 400, then the coded watermark data could be recovered based on a recorded set of information that included only the selected locations, where watermark recovery system 400 tested each modulated version of each different watermark carrier for each selected location to determine the value of the corresponding bit of the coded watermark data.

The processing indicated in FIG. 4 shows yet another possible implementation of a watermark recovery algorithm. In this implementation, in addition to the set of watermark carriers generated during carrier generation 202, the watermark insertion algorithm of FIG. 2 records the results of region classification 204 (i.e., the set of available locations and their corresponding watermark carriers) as well as the secret watermark key for each different watermarked version of the input video work. As indicated in FIG. 4, the secret watermark key is applied to a secure random number generator 406 that implements the same algorithm as random number generator 206 of FIG. 2 to reconstruct the same sequence of values used now by location selection 408 to select from the recorded set of available locations. Carrier demodulation 410 would then involve testing each modulated version of the corresponding watermark carrier for each selected location identified in location selection 408 to recover the coded watermark data. Watermark decoder 412 then decodes as required by the associated encoding process implemented by watermark encoder 212. For example, watermark decoder 412 may apply a Viterbi decoder to correct for bit errors and then decrypt with a secret cipher key.

Here, too, in an alternative implementation, if the set of available watermark carriers is known, the data recorded during the watermark insertion processing need not explicitly include identification of the corresponding watermark carriers. In such case, carrier demodulation 410 could test each modulated version of each different watermark carrier at each selected location identified by location selection 408 to recover each bit of watermark data.

ALTERNATIVE EMBODIMENTS

In one implementation of the present invention, both the (unmarked) input video work and the (marked) output video work are digital video bitstreams. In alternative implementations, one or both of input and output works could be analog video signals.

In preferred implementations, the modulated watermark carriers are added to the luminance (i.e., brightness) pixel data, for example, in a conventional YUV or YCrCb color space, the watermark carriers are added to the Y channel. In alternative implementations, modulated watermark carriers could be applied to the color components of the data instead of or in addition to being applied to the brightness component. Moreover, the present invention can also be implemented in color spaces that do not have specific luminance data, such as the conventional RGB color space, where the modulated watermark carriers could be added to any combination of the red, green, and/or blue pixel data.

In preferred embodiments of the present invention, the watermark carriers are 3D spatio-temporal Gaussian functions having a peak value at some specified X, Y, and t location, whose amplitude falls off in all temporal and spatial directions from that location. In other embodiments described above, the watermark carriers are 3D spatio-temporal patterns having rectilinear shapes in the 3D video space. In other alternative embodiments, 3D spatio-temporal patterns having shapes other than rectilinear can be used as watermark carriers, including cylindrical or elliptical (including spherical). Furthermore, one or more of the watermark carriers could be one-dimensional, where each pattern corresponds to a one-dimensional curve (including a straight line) in the 3D video space. Similarly, one or more of the watermark carriers could be two-dimensional, where the pattern corresponded to 3D curvilinear surface (including a flat plane) in 3D video space. Depending on the particular watermark carrier, the 1D or 2D patterns could be oriented in any possible manner with respect to the X (height), Y (width), and Z (duration) axes of the 3D video space. In addition, watermark carriers could correspond to either contiguous or non-contiguous sets of pixels, whether those sets form one-, two-, or three-dimensional patterns.

Although the present invention has been described in the context of a video frame as a single entity, those skilled in the art will understand that the invention can also be applied in the context of interlaced video works and associated field processing. As such, unless clearly inappropriate for the particular implementation described, the term "frame," especially as used in the claims, should be interpreted to cover applications for both video frames and video fields.

Although the present invention has been described in terms of video data, the present invention could also be implemented in the context of audio data.

The present invention may be implemented as circuit-based processes, including possible implementation on a single integrated circuit. As would be apparent to one skilled in the art, various functions of circuit elements may also be implemented as processing steps in a software program.

Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding watermark data into an image sequence, comprising:
    (a) identifying a set of one or more watermark carriers for potential use in encoding the watermark data into the image sequence;
    (b) analyzing content of the image sequence to identify a plurality of potential locations in the image sequence for encoding the watermark data into the image sequence, wherein each potential location corresponds to an acceptable encoding of a portion of the watermark data using a particular one of the watermark carriers in the set, wherein the set comprises at least one watermark carrier based on a spatio-temporal frequency pattern, having a frequency below a peak of a spatio-temporal contrast sensitivity function;
    (c) selecting a subset of the potential locations; and
    (d) for each selected location, modulating the corresponding watermark carrier by a portion of the watermark data and inserting the resulting modulated watermark carrier into the image sequence at the selected location.

2. The invention of claim 1, wherein the portion of the watermark data corresponds to a single bit of watermark data.

3. The invention of claim 1, wherein:
    step (b) identifies two or more different watermark carriers for at least one potential location; and
    step (c) selects one of the two or more different watermark carriers for that at least one potential location.

4. The invention of claim 1, wherein:
    step (b) divides the image sequence into a plurality of regions and identifies a plurality of potential locations in each region; and
    step (c) selects one or more of the potential locations in each region.

5. The invention of claim 4, wherein the image sequence is a video work and each region corresponds to a three-dimensional (3D) spatio-temporal volume of video data in the video work.

6. The invention of claim 5, wherein each region corresponds to a plurality of consecutive video frames in the video work.

7. The invention of claim 1, wherein the image sequence is a video work.

8. The invention of claim 7, wherein at least one of the watermark carriers is based on a three-dimensional spatio-temporal pattern and each corresponding modulated watermark carrier is inserted into the video work in the spatial domain.

9. The invention of claim 8, wherein each corresponding modulated watermark carrier is added to luminance components in the video work.

10. The invention of claim 1, wherein the image sequence comprises an audio work.

11. The invention of claim 1, wherein each potential location corresponds to a location where a single modulated watermark carrier can be inserted imperceptibly, but where insertion of two or more modulated watermark carriers at or near the potential location results in perceptible artifacts.

12. The invention of claim 1, wherein each selected location is separated from all other selected locations by a specified minimum distance.

13. The invention of claim 1, wherein step (b) uses a perceptual model to identify the plurality of potential locations.

14. The invention of claim 13, wherein step (b) implements a JND (Just Noticeable Difference) analysis to identify the plurality of potential locations.

15. The invention of claim 1, wherein:
    step (b) performs a cluster analysis to characterize distribution of the potential locations; and
    step (c) selects the subset of potential locations based on results from the cluster analysis.

16. The invention of claim 15, wherein the subset of potential locations corresponds to clusters of the potential locations having relatively high density.

17. The invention of claim 1, wherein step (c) randomly selects the subset of potential locations.

18. The invention of claim 17, wherein step (c) randomly selects the subset of potential locations based on a sequence of values generated by a random number generator operating in accordance with a secret watermark key.

19. The invention of claim 1, wherein the at least one watermark carrier has a sensitivity at least an order of magnitude below the sensitivity at the peak.

20. The invention of claim 1, wherein the image sequence is a video work and the at least one watermark carrier is based on a three-dimensional spatio-temporal Gaussian pattern whose amplitude falls off from a central peak in all spatial and temporal directions.

21. A method for encoding watermark data into an image sequence, comprising:
    (a) modulating a watermark carrier by a portion of the watermark data, wherein the watermark carrier is based on a spatio-temporal frequency pattern having a frequency below a peak of a spatio-temporal contrast sensitivity function; and
    (b) inserting the resulting modulated watermark carrier into the image sequence at a selected location.

22. The invention of claim 21, wherein a watermark carrier has a sensitivity at least an order of magnitude below the sensitivity at the peak.

* * * * *